United States Patent

Hallgreen et al.

[11] 3,975,620
[45] Aug. 17, 1976

[54] CONTROL SYSTEM FOR CHARGING AND DISCHARGING AN ELECTRIC STORAGE HEATER

[75] Inventors: Knud Julius Hallgreen; Poul Christian Carlos Iversen, both of Nordborg, Denmark

[73] Assignee: Danfoss A/S, Nordborg, Denmark

[22] Filed: Jan. 2, 1975

[21] Appl. No.: 537,925

[30] Foreign Application Priority Data
Jan. 15, 1974  Germany.......................... 2401659

[52] U.S. Cl.............................. 219/364; 126/400; 165/18; 219/378; 219/491; 219/493
[51] Int. Cl.²...................... H05B 1/02; F24H 7/04; F24D 11/00
[58] Field of Search .......... 219/364, 365, 378, 341, 219/530, 540, 493, 492, 491; 126/400; 165/18

[56] References Cited
UNITED STATES PATENTS

| | | | |
|---|---|---|---|
| 2,450,983 | 10/1948 | Osterheld.......................... | 219/365 X |
| 2,808,494 | 10/1957 | Telkes............................ | 126/400 X |

FOREIGN PATENTS OR APPLICATIONS

| | | | |
|---|---|---|---|
| 1,465,050 | 12/1968 | Germany ........................ | 219/364 |
| 2,026,614 | 12/1971 | Germany ........................ | 219/364 |
| 2,021,997 | 4/1970 | Germany ........................ | 219/364 |
| 2,150,798 | 4/1972 | Germany ........................ | 219/364 |

*Primary Examiner*—A. Bartis

[57] ABSTRACT

An electric storage heater assembly which is charged at night when energy rates are low and utilized during the day when the rates are higher. A fan unit is controlled by a thermostat to extract heat from the heater assembly. The previous days experience relative to the total time the fan operates is a measure of the heat to be stored during the off hours. An integrator with input and output switching elements activated by a clock controlled time switch is used in connection with a three position room thermostat, the positions being for high and low temperatures and neutral. The input switching element has positive and negative terminals and during day operation, the time the thermostat is in its low temperature position is summed through the positive terminal. The time the thermostat is in its high temperature position is subtracted from the accumulated value of the integrator through the negative terminal. The output switching element operates at night and controls the charging of heat storage assembly in accordance with the net accumulated value in the integrator which was determined by the experience incurred during the day.

4 Claims, 1 Drawing Figure

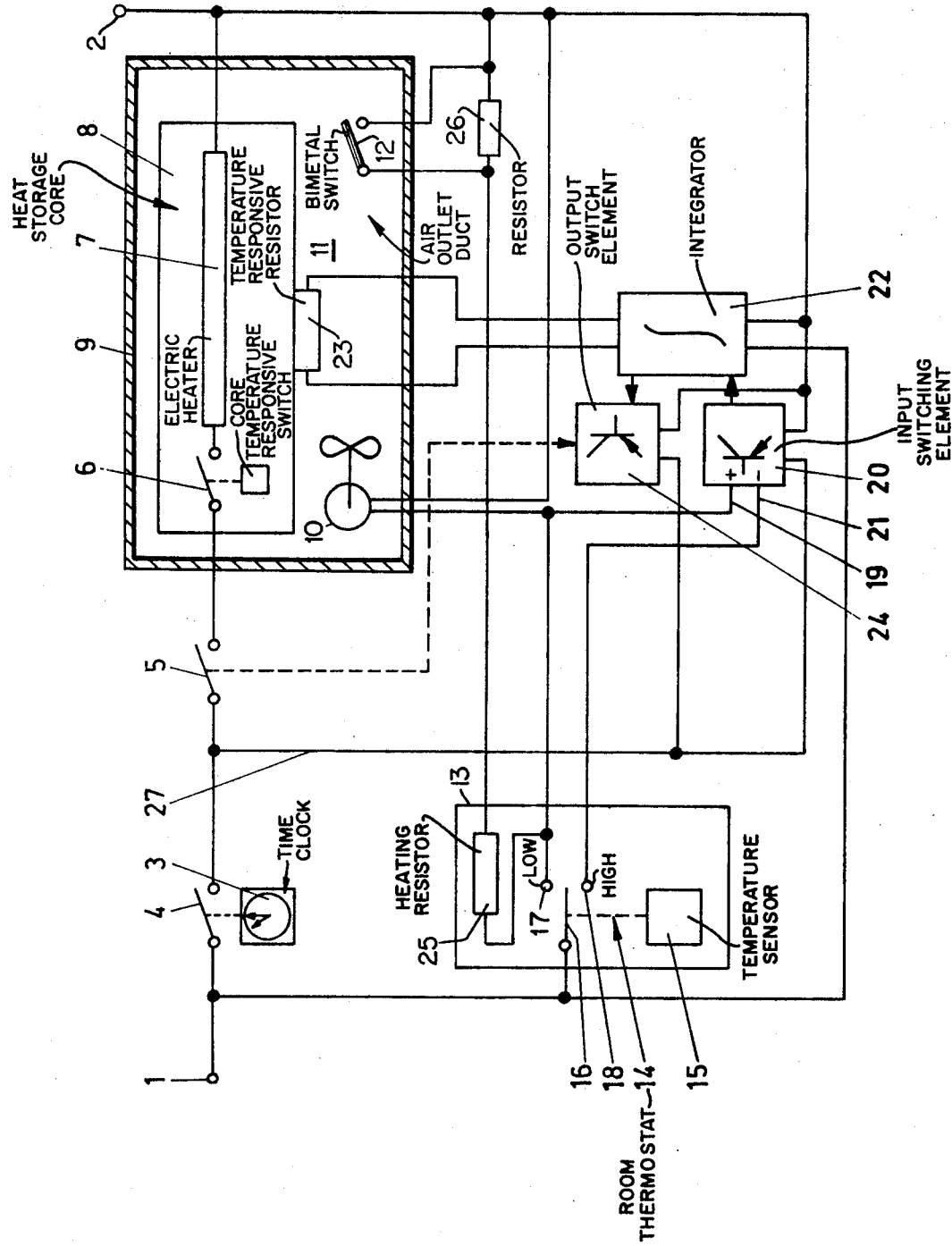

CONTROL SYSTEM FOR CHARGING AND DISCHARGING AN ELECTRIC STORAGE HEATER

The invention relates to a charging and discharging apparatus for an electric storage heater, the discharge of which apparatus is achieved by means of a blower or the like which can be switched on and off, the running times of the blower being summated by an integrator and the sum being used as a measure for charging. Instead of the blower, a simple flap valve for example may be used, thus closing or opening an air-outlet orifice.

Among the numerous proposals for supplying an electric storage heater, during the night (or some other low-tariff period), with just sufficient energy to cover the heat requirements on the following day, the proposals that have proved particularly reliable are those in which charging takes place by reference to data collected on the previous day. In this system, charging may be carried out using either a constant supply or power over a variable period, or a variable supply of power, e.g. by connecting in a differing number of heating resistors.

It is known to record the running time of the discharging blower by means of summating relay and to fix the quantity of heat required for charging in dependence upon the recorded sum.

However, this method of measuring the running time leads to relatively inaccurate results.

The object of the invention is to provide a charging and discharging apparatus of the initially described kind in which charging is better suited to actual requirements.

According to the invention this object is achieved by a room thermostat having three positions, i.e. a reduced temperature position in which the blower is switched on, a normal temperature position in which the blower is switched off, and an excess temperature position, the period of retention of which is subtracted from the sum of the running times of the blower in the integrator.

In this way the charging of the storage core is reduced by that quantity of heat that leads to excess temperature in the room. "Excess temperature" means a value above the temperature at which the room thermostat is set plus its normal switching differential. This excess temperature may have different causes. It may result from an "unnecessary consumption" which is caused by uncontrolled release of heat from the storage means, e.g. because of excessive heating up or inadequate insulation. It may however also be caused by "free heat" supplied to the room from any other source and not stemming from the storage means. The subtraction in the integrator ensures that, during charging, no energy peak is present that could lead to an excess temperature.

It is also preferred to provide, in association with the storage heater, a sensor for the uncontrolled dissipated heat, the value measured by the sensor being continuously integrated in the integrator, and the integral being added to the sum of the running times of the blower. In particular, the sensor may be a temperature-responsive resistor which is thermally connected to the core of the storage heater. In this way it is possible to determine the uncontrolled dissipated heat from which the room benefits and which therefore has to be supplied again in the charging period in order to replace the total quantity of dissipated heat.

With such a control arrangement, it is possible for the storage heater to be charged just sufficiently for it to be "empty" at the end of the discharge period, so that the optimum power conditions are established. A storage means is said to be "empty" when its core temperature has dropped so low that a constant quantity of heat can no longer be given off when the blower is working.

If, a result of special circumstances, a greater amount of heat is required and the room temperature drops accordingly, the blower begins to work despite the storage means being "empty". This additional running time indicated that the storage heater must be charged to a greater extent during the next charging period. However, since the blower, because of the diminishing quantity of heat, must run for a longer period than when the storage means is "full" and, in some circumstances, would remain continously switched on, an error would occur in the summation of the running times.

This error can be eliminated by fitting a temperture sensor in the blower outlet duct of the storage heater, which sensor actuates device which reduces the running time of the blower, when the temperature of the outgoing air drops. In this arrangement, a heating resistor, which can be heated to a greater extent when the temperature of the outgoing air drops, can be associated with the room thermostat. In particular, the temperature sensor may be a bimetal switch which is normally open and which by-passes an upstream resistor and is in series with the heating resistor. The heating resistor additionally heats the room thermostat so that the required value to which the thermostat is set drops and the thermostat switch is actuated at lower temperatures to switch off the blower. The heating resistor can be easily so rated that when the next charging takes place the reduction of charge occurring during the last discharge period is compensated and the additional heat requirement for the next discharge period is put into storage.

In a preferred arrangement, an input switching element, fed by the room thermostat, and an output switching element, actuating a charging switch, are associated with the integrator, and, in dependence upon the position of a time switch indicating the low-tariff period, the input switching element or the output switching element is effective while the other of them is not. This results in the integrator collecting the corresponding data during the normal-tariff period and in the setting of the period during which the charging switch in "on" during the low-tariff period, in dependence upon the integral obtained from these data.

In this arrangement, there is no difficulty in starting up the blower by means of the room thermostat even during the charging period, so as to maintain the required room temperature or a reduced night temperature. Even when this running time is not stored, no difficulties arise since if too much heat is discharged at the end of the following discharge period undercharging of the storage heater would exist and this would be automatically compensated during the next charging.

The invention will now be described in greater detail by reference to a diagrammatically illustrated embodiment.

A time switch 4, which is controlled by a clock 3 and is closed only during the low-tariff period, a charging switch 5, a switch 6 which opens at excess temperature, and a heating resistor 7 are connected in series across the terminals 1 and 2 of a supply system. The heating resistor 7 together with the excess temperature switch 6 is located in the storage core 8 of a storage heater 9. The drawing shows diagrammatically that this storage heater has a blower 10, in the outlet duct 11 of which is fitted a bimetal switch 12.

Provided in the room to be heated is a regulator 13 which has a thermostat 14 with a sensor 15, and a moving contact 16 which can occupy any one of three positions i.e. a reduced temperature position, in which it touches a fixed contact 17, a normal temperature position which is illustrated in the drawing, and an excess temperature position in which it touches a fixed contact 18. One side of the fixed contact 17 is disposed in the lead to the blower 10 and its other side is connected to the positive connector 19 of an input switching element 20. A negative input 21 of the input switching element 20 is connected to the fixed contact 18. An integrator 22 receives input signals through the input switching element 20 and from a temperature-responsive resistor 23 which is connected to the core 8 of the storage heater 9 so that heat from the core is transmitted to this resistor. The output of the integrator 22 acts on the output switching element 24 which when energized closes the charging switch 5. Also, a heating resistor 25 is associated with the thermostat 14, this resistor being in series with an upstream resistor 26 which is by-passed through the bimetal switch 12.

The mode of this apparatus is as follows:

The drawing illustrates an operating position during the discharge period in which the set required value corresponds to the room temperature. If the temperature drops, the room thermostat 14 occupies the reduced temperature position. The blower 10 begins to operate. At the same time this running time is transmitted through the input switching element 20 to the integrator 22 where this time is integrated. As soon as the required value for the room temperature is reached, the thermostat returns to the rest position illustrated in the drawing. If for some reason the room temperature is too high, the room thermostat moves into the excess temperature position and act upon the negative connection 21 of the input switching element 20. Consequently the period during which the thermostat is in this position is integrated in the integrator 22 with negative sign. As a result, the existing excess heat is taken into account during the next charging.

Also, the integrator 22 is continuously acted upon by a signal from the temperature-responsive resistor 23, the value that this resistor measures constituting a measure of the uncontrolled heat dissipated by the storage heater 9. Consequently, this value is also integrated and taken into account during the next charging.

If the stored quantity of heat is insufficient, the storage heater 9 no longer releases a constant quantity of heat when the blower 10 is switched on. Consequently the temperature in the outlet duct 11 drops, and the bimetal switch 12 closes. Consequently, the heating resistor 25, which has hitherto been only slightly heated, because of the series connection with the upstream resistor 26, is heated to a greater extent. This heating acts on the temperature sensor 15 of the room thermostat 14, so that the moving contact 16 returns to the illustrated neutral position at an earlier stage than would correspond to the room temperature. Consequently, the disproportionately lengthy running period of the blower 10, resulting from the diminishing temperature of the blower air, is reduced to a value which, upon integration in the integrator 22, gives a final value which, during the next charging, allows for the undercharging in the current discharging period and for additional charging, corresponding to the heat requirements, for the next discharging period.

By switching on the time switch 4, voltage is also applied to the lead 27. The effect of this voltage on the two switching elements 20 and 24 is that the switching element 20 becomes ineffective and the switching element 24 effective. Consequently, the charging switch 5 is closed until the integrator 22 has completed its delivery of the stored value through the output switching element 24. During this time the blower 10 can be started up when the temperature is reduced. When the low-tariff period has ended and the time switch 4 has opened, the output switching element 24 becomes ineffective, and the input switching element 20 is rendered effective again so that a fresh discharging period with integration of the corresponding data can commence.

Integration need not be carried out by electrical means; instead it may take place with the aid of mechanical means. Similarly, the switching elements 20 and 24 may be mechanical rather than electrical.

We claim:

1. An electric storage heater assembly comprising a main circuit having in series heating element means, a clock controlled time switch and a main charging switch, heat storage means in heat exchange relationship with said heating element and fan means for conveying heat away from said heat storage means, room thermostat means having a neutral position along with low and high temperature position terminals, said fan means being connected to said thermostat low temperature position terminal for operation when said room thermostat is in the low temperature position, an electric integrator, input and output switching means alternately connected to said integrator through said time switch, said input switching means being operative only when said time switch is open and said output switching means being operative only when said time switch is closed, said input switching means having positive and negative terminals with said positive terminal being electrically connected in circuit with said fan means and to said low temperature position thermostat terminals, said negative terminal being electrically connected to said high temperature position thermostat terminal, said main charging switch being connected to and closed by said output switching means for a period of time in accordance with the output signal of said integrator.

2. An electric storage heater assembly according to claim 1 including first heat sensing means in heat exchange relationship with said heat storage means for detecting uncontrolled heat dissipated from said heat storage means, said sensing means being connected to said integrator for positive summing action.

3. An electric storage heater assembly according to claim 1 including duct means associated with said heat storage means for conveying a stream of air produced by said fan means, second heat sensing means in said duct means for sensing the temperature of said stream of air, said room thermostat having means responsive to said second heat sensing means to actuate said room thermostat means to move said low temperature position to a neutral position upon said air stream dropping to a predetermined low temperature.

4. An electric sotrage heater assembly according to claim 3 wherein said second heat sensing means is a normally open bimetal switch in parallel with a load resistor and in series with a heating resistor which has a thermal effect on said room thermostat means.

* * * * *